2,847,367
MICROCRYSTALLINE WAX COMPOSITIONS

John W. Walsh, Crystal Lake, and Weldon Grant Annable, Mundelein, Ill., assignors to The Pure Oil Company, Chicago, Ill., a corporation of Ohio No Drawing. Application October 29, 1954
Serial No. 465,736

4 Claims. (Cl. 196—149)

This invention relates to a microcrystalline wax composition. More particularly, it relates to a microcrystalline wax composition having superior low-temperature characteristics, rendering it especially suitable as a wide-range laminating and coating composition.

Microcrystalline waxes are those waxes which have a finer, less apparent crystalline structure than paraffin wax and which comprise a solid hydrocarbon mixture of molecular weight averaging higher than paraffin wax. Microcrystalline waxes possess plastic properties and are obtainable from crude petroleum fractions commonly designated as heavy lubricating and cylinder oil stocks. Petrolatum wax is the term applied to microcrystalline wax refined from heavy petrolatum stock; and is usually of a sticky nature with about 155–165° F. melting point and penetration value of more than about 25. Crude petrolatum wax contains as much as 30 percent oil; the oil content may be reduced considerably by a number of processes, for example, reprecipitation of the fraction from naphtha or by pressing. Microcrystalline waxes containing a smaller amount of oil than petrolatum wax are generally of higher melting point, that is, 170° to 195° F., and in some cases up to 200° F. melting point. All microcrystalline waxes are of about the same molecular weight and are said to be composed of hydrocarbon chains of twice the length of those of the macrocrystalline waxes. The cause of the small size of the crystalline structure is not definitely known but, according to some authorities, has been attributed to the presence of an unsaturated hydrocarbon. The presence of oil apparently has the effect of further inhibiting macrocrystallization.

Microcrystalline waxes because of their plasticity and other suitable characteristics, including in general a relatively high melting point, have found extensive commercial use. Microcrystalline waxes have been utilized to advantage as adhesives or binding agents for laminating plies of various substances, usually paper, as in the preparation of field-ration packages and food wrappers and as grease- and water-proof coatings on meat and fruit, milk bottles, cardboard cartons and the like. These waxes have found application for the same general purposes as paraffin waxes.

Because of their adhesiveness and plasticity over fairly wide temperautre ranges, microcrystalline waxes have been used particularly in the field of coating of paper and similar substances. Microcrystalline waxes which have been used at relatively low temperatures as surface coatings, and also as laminating agents in the preparation of multiply paper, have not been completely satisfactory because of their brittleness and lack of pliability. In general, however, they have been more satisfactory than paraffin waxes which exhibit greater brittleness under such low temperature conditions. In the packaging of foods which are frozen and stored at low temperatures, all types of waxes which have been utilized heretofore have proved to be unsatisfactory per se. Resort has had to be made to the compounding of the most suitable type of waxes, namely, the microcrystalline waxes, with foreign materials to modify the insufficient flexibility at low temperatures such as −10° F. Frequently, the foreign materials have been found to be difficult to blend with the wax, or expensive, or otherwise unsatisfactory. Foreign materials commonly used to increase low temperature flexibility have been rubber, resins, polymers and the like.

A compounded microcrystalline wax has been sought which would afford good coating characteristics at low (down to −10° F.) temperatures as well as at room or normal temperatures, that is, would not scuff or peel, would be adhesive to papers and the like, yet not be tacky to the touch and would remain flexible. A laminating wax would require similar flexibility, plus a pleasant odor and good bonding properties. In order to achieve such goals in a single, multi-purpose wax, microcrystalline wax prepared by special techniques has been blended with mineral oil to produce a low-temperature, laminating composition. However, such microcrystalline wax has been of a hard nature, with a melting point substantially above 180° F. and a viscosity of about 120 seconds or more SUS 210° F. This blended wax exhibits superior high-temperature laminating characteristics, but at room temperature (65°–80° F.) would be excessively tacky or sticky and inferior when compounded with a sufficient amount of oil to render it suitable as a normal and low-temperature coating composition.

Accordingly, it is an object of our invention to provide a superior laminating and coating wax. It is another object of our invention to provide a superior petroleum hydrocarbon microcrystalline wax composition which is flexible and adherent to paper and other fibrous materials at low and ordinary temperatures, and is especially suitable both as a coating composition and as a laminating composition for use over a wide temperature range, extending to at least −10° F. Other objects, advantages and uses of our invention are apparent from this specification and accompanying claims.

It has been discovered that microcrystalline wax can be suitably modified by the addition thereto of a critical amount of a petroleum hydrocarbon oil fraction which renders it sufficiently flexible at low and freezing temperatures and sufficiently adhesive to paper and the like materials to be bonded to multi-ply paper and to furnish other superior coating and laminating properties. Both the coating characteristics and the laminating properties of our microcrystalline wax composition remain suitable for commercial use over a wide temperature range, including temperatures as low as −10° F. or below. Indiscriminate addition of hydrocarbon oil to the microcrystalline wax cannot achieve similar results. A limited range of oil concentration has been found within which satisfactory characteristics are imparted to the wax by the oil.

Microcrystalline waxes used as the bases in the composition of our invention have the following general characteristics:

TABLE I

| | |
|---|---|
| Melting point, °F | Below 180° F. and above about 165° F. |
| Penetration at 77° F | Above 15. |
| Viscosity SUS 210° F | Below 90. |
| Stain test | Does not pass at 120° F. |

The microcrystalline wax of our invention may be obtained from a Van Zandt crude or from other petroleum sources. In the process of refining, the Van Zandt or other crude oil is divided into a number of fractions including a fraction from which lubricating oils are ultimately derived. This fraction is further fractionated by the use of steam and/or vacuum into neutral fractions of various viscosities, and residuum. From said residuum, the microcrystalline wax may be derived.

During the process of separation of microcrystalline wax, the cylinder stock is subjected to normal dewaxing and deoiling procedures to produce the finished wax of the characteristics above noted in Table I. Dewaxing may be performed by any one of a number of suitable processes, including solvent extraction and low-temperature crystallization, followed by separation by centrifugation. Solvent dewaxing may employ any one of a number of suitable solvents or solvent mixtures, or solvent-anti-solvent mixtures, but preferably utilizes a mixture of methyl ethyl ketone and toluene in a ratio of solvent mixture-to-oil of about 1:1 to 4:1, depending upon the nature and viscosity of the charge stock. In a typical operation, after suitable contact of solvent with the oil fraction, rich solvent containing dissolved wax is separated from the oil by a suitable means, such as a settling-tank or the like, after which the solvent is removed from the wax by the application of heat and/or reduced pressure, and the wax is obtained in relatively pure, solid form. The characteristics of the microcrystalline wax at this stage in the processing somewhat depend upon the concentration of oil entrained therein.

Generally, wax is obtained with a relatively large oil content so that the wax has a low melting point and is tacky. This wax is therefore of the petrolatum type. The oil content of the microcrystalline wax is further decreased to about 0.7 percent for a commercially-used, microcrystalline wax of characteristics as given in Table I above, by any one of a number of deoiling methods, such as pressing to squeeze the oil out or by the application of heat and/or reduced pressure. Preferably, a second solvent extraction may be performed at conditions similar to those of the dewaxing step except for higher temperatures. The wax may be precipitated from the solvent solution by chilling and be removed by centrifugation; or, the solution containing the wax may be filtered to remove solvent and oil therefrom to produce purified, deoiled microcrystalline wax.

Following the dewaxing and deoiling procedure, which may be carried out in conventional apparatus, the substantially oil-free microcrystalline wax, containing only about 0.7 percent of retained oil, may be subjected to a bleaching process, if desired. The bleaching process may incorporate fuller's earth, fine-grain form of clay, essentially calcium montmorillonite. The fuller's earth is utilized in a percolation or contact operation. For a percolation process, tanks 5 to 10 feet in diameter and 20 to 30 feet high are used in which the fuller's earth of granular (30 to 60 mesh) form is placed and through which the wax which has been heated to a liquid form is run. In a contact process, fine fuller's earth, etc., are mixed to an extent of about 10 percent with hot, molten wax in a large vat, and further heated to a temperature about 20 percent above the wax fusion point, after which the wax is squeezed from the clay in a filter press.

The hydrocarbon oil fraction which may be used as the additive in the preparation of the composition of our invention to improve the beneficial, low-temperature characteristics of the microcrystalline wax may be any lubricating oil fraction, such as 170 SUS (at 210° F.) viscosity bright stock, or an aromatic extract from a lubricating oil base stock, such as that obtained by phenol extraction. Soft waxes are unsatisfactory fractions for this purpose and should not be used. Soft waxes are those of low melting point (approximately 75°–125° F.) which contain variable amounts of oil and are separated during the preparation of microcrystalline waxes.

As stated above, in general our invention comprises a microcrystalline wax composition with superior laminating and coating characteristics. In particular, our invention comprises a microcrystalline wax composition incorporating a petroleum lubricating oil fraction in a critical amount which is especially effective in low-temperature use of the composition, such as in the coating and laminating of meat wrappers and other papers utilized as coverings for perishables stored at low temperatures. A particular point of novelty of our invention comprises the discovery of a critical concentration of a petroleum lubricating oil fraction to obtain greater flexibility in the wax, as well as increased laminating strength, at temperatures as low as −10° F. without tackiness at any ambient temperatures.

Stickiness or tackiness cannot be tolerated in a coating wax, that is, the coating wax must be adhesive in order to closely adhere to the surface, but it cannot be tacky or soft to the touch. The coating, for example, of a paper carton must be closely adherent to the paper surface but one must be able to handle the coated container without marring or removing the coating. A superior coating wax must also have flexibility in order to resist chipping, cracking and peeling when the coated surface is subjected to bending stress.

A laminating wax must also have enough adhesiveness to closely adhere to the surface to be treated, for example, sufficient to bond together two plies of a substance such as paper and must remain pliable at any temperatures to which the wax-bonded material normally may be exposed. Moreover, a satisfactory laminating wax must also have a high degree of laminating strength over a wide temperature range so that the laminated plies will not be pulled apart or peel under normal conditions of use.

To be commercially desirable, both laminating wax and coating wax should have a suitable odor, especially since many current uses place such waxes in contact with or near edibles.

The microcrystalline wax composition of our invention was experimentally compared with three other waxes, wax A, wax B and wax C, said waxes being commercial laminating preparations of microcrystalline wax. The results are recorded below in Table II:

TABLE II

| | Odor |
|---|---|
| (1) 95% light microcrystalline wax (wax of characteristics of Table I), 5% special Oil W (bright stock with a viscosity index of 85–90) | 3 |
| (2) 90% light microcrystalline wax, 10% special Oil W | 3.5 |
| (3) 85% light microcrystalline wax, 15% special Oil W | 3 |
| (4) Wax A | 4 |
| (5) Wax B | 4 |
| (6) Wax C | 3.5 |

The odor test was conducted in the following manner: A 50 ml. beaker is half filled with distilled water and is heated to the boiling point. Two to three grams of the wax to be evaluated are placed in the hot water so that the wax when melted forms a liquid layer approximately ⅛″ thick on the surface of the water. The contents of the beaker are swirled and the vapors are sniffed to determine if the wax possesses an odor. Odors range as follows: odorless, slight, moderate, objectionable. Ratings are assigned in this order on a numerical scale ranging from 1 to 4. The lower the odor number, the more satisfactory the odor.

The above table indicates that the compounded wax composition of our invention, i. e., (1), (2), and (3) had odors comparable with commercial laminating wax C and better than those of commercial laminating waxes A and B. The composition of our invention is therefore at least as suitable in odor as current, commercial laminating waxes and is better than some laminating waxes in that respect.

Table III exhibits the low-temperature flexibility of a number of microcrystalline wax compositions, namely, those containing the microcrystalline wax utilized as the base in the composition of our invention, together with a variety of higher-boiling petroleum fractions. The low-temperature flexibility test was performed in the following manner: The waxes to be tested for low-temperature flexibility are prepared by coating a film of the wax approximately ⅛" thick on the surface of hot water in a flat glass dish such as a Petri dish. The wax is permitted to solidify and is then cut into strips measuring 1" x 3" x ⅛". These test strips of wax are placed in a refrigerator maintained at $-10°$ F. for 1 hour. The conditioned strips are then placed in a slot of the testing device which holds one end of the wax strip rigid while the other end may be bent back and forth through 180°. The test is run in the refrigerator at $-10°$ F. and the flexibility is evaluated as follows. 0 bends (if strip is brittle and breaks before going through 90°) to 30+ bends. Tests are run on five strips and the number of bends are averaged as an indication of low-temperature flexibility.

TABLE III

Low-temperature flexibility

| Composition | | Microcrystalline Wax,[3] Percent W | Flexibility at $-10°$ F. |
|---|---|---|---|
| Modifying Agent | Percent W | | |
| None | 0 | 100 | None; brittle. |
| Petrolatum | 5 | 95 | Do. |
| | 10 | 90 | Do. |
| | 15 | 85 | Do. |
| | 25 | 75 | Do. |
| | 40 | 60 | Do. |
| Soft Wax (from 85 viscosity neutral stock) | 5 | 95 | Do. |
| | 10 | 90 | Do. |
| | 15 | 85 | Do. |
| 170 viscosity neutral oil | 5 | 95 | Do. |
| | 10 | 90 | Same; good for 5 bends. |
| | 15 | 85 | Good; good for >30 bends. |
| 150 viscosity bright stock | 5 | 95 | None; brittle. |
| | 10 | 90 | Same; good for 11 bends. |
| | 15 | 85 | Good; good for >30 bends. |
| Extract B [1] | 15 | 85 | Good; good for 30 bends. |
| Extract N [2] | 17.5 | 82.5 | Do. |

[1] Extract B is a commercial phenol extract obtained in making high viscosity index bright stock.
[2] Extract N is a commercial phenol extract obtained in making high viscosity index neutral oil.
[3] The microcrystalline wax is the wax described for Table I above.

In addition, the laminating strength of various microcrystalline waxes modified with varying quantities of higher-boiling hydrocarbon fractions was tested by the following procedure, the results of which appear in Table IV.

The laminated strips are separated at one end and one piece is fastened to a fixed clamp. The other piece is fastened to a clamp attached to a gear driven motor. The force required to separate the balance of the laminated strip is measured and recorded. If no steady pull is observed, the wax composition is reported to have a laminating strength of "nil." If a steady rate of separation is obtained, 70 to 100 readings are taken and the results are averaged. Results are reported in gms./inch.

TABLE IV

Laminating strength

| Composition | | Microcrystalline Wax,[1] Percent W | Laminating Strength, gms./in. |
|---|---|---|---|
| Modifying Agent | Percent W | | |
| None | 0 | 100 | Nil |
| 150 viscosity Bright Stock (Smiths Bluff) | 5 | 95 | 68 |
| | 10 | 90 | 42 |
| | 15 | 85 | 50 |
| 170 viscosity neutral oil | 5 | 95 | 31 |
| | 10 | 90 | 54 |
| | 15 | 85 | 51 |
| Extract B | 15 | 85 | 69 |
| Extract N | 17.5 | 82.5 | 69 |
| 150 viscosity Bright Stock (Cabin Creek) | 5 | 95 | 40 |
| Do | 10 | 90 | 64 |
| Do | 15 | 85 | 61 |

[1] The microcrystalline wax is the wax described for Table I above.

The results of the above tests indicate that the flexibility of microcrystalline wax of the type utilized as a base in the microcrystalline wax composition of our invention is especially suitable, that is, is sustained over a test period of more than 30 bends, when a lubricating oil fraction, such as 170 viscosity neutral oil, or other fraction is utilized in a concentration of about 15 weight percent, based on the total weight of oil, with the microcrystalline wax. With the same modifying agent, less satisfactory results may also be obtained in most cases with only about 10 weight percent of the modifying agent, that is, flexibility is sustained over a test period of about 5 bends. The 15 weight percent concentration is, of course, preferred. However, it should be noted that when the modifying agent, such as 170 viscosity neutral lube oil, is present in a lesser weight percentage, for example 5 weight percent, the flexibility of the wax-oil composition drops to 0 and the composition is too brittle at $-10°$ F. to be satisfactory as a low-temperature, coating composition. Comparable results are obtained when other petroleum lubricating oil fractions are utilized in combination with the microcrystalline wax in comparable concentrations of 5–15 percent; thus, when Extract B was utilized in 15 weight percent concentration, satisfactory flexibility was obtained, as was the case when Extract N was utilized in a slightly greater concentration of 17.5 weight percent. In the latter case, the coating ability and flexibility of the wax-oil composition was present with above 15 weight percent oil, but as has been noted heretofore, concentrations substantially greater than 15 weight percent impart undesirable tackiness to the coating composition and render it unsuitable for use, even though the flexibility may have been increased. It is therefore shown that with respect to all of the coating characteristics of the microcrystalline wax composition of our invention, a critical range of total oil concentration is necessary, and when the oil concentration falls below about 15 weight percent the composition is more like unmodified wax, brittle at $-10°$ F. and hence unsatisfactory for coating. While concentrations of 10 weight percent of the modifying agent produce flexible wax compositions, concentrations of about 15 weight percent produce greatly increased flexibility. Moreover, the optimum of about 15 percent by weight of modifying agent cannot be greatly exceeded without deleteriously affecting the other desirable properties of the coating wax, rendering said wax too tacky for use at room or normal temperatures.

With regard to the laminating strength of the various microcrystalline wax-modifying agent compositions, Table IV above shows that a satisfactory laminating strength, calculated in grams per inch is obtained when Extract B is blended with the microcrystalline wax in an amount of about 15 percent, said blend giving a value of 69; Extract N also registers a value of 69 when 17.5 weight percent is used in combination with the microcrystalline wax. A relatively high reading, 51, is attained when 15 percent 170 viscosity neutral lube oil is added to microcrystalline wax, and a slightly higher reading is attained when the same oil is added in 10 percent amount to the wax. A slightly lower, but still satisfactory reading of 50 is obtained when 15 weight percent of 150 viscosity bright stock is added to the wax. However, when 5 weight percent of 170 viscosity neutral oil or 150 viscosity bright stock is added, the laminating strength is somewhat lower than with percentages near the optimum.

The above results indicate that the addition of 10–15 weight percent of a petroleum lubricating oil fraction to the wax increases its laminating strength to a high value; in the absence of such modifying agent the laminating strength of the base wax is nil.

Table V below further illustrates the influence of oil concentration on the wax properties.

TABLE V

| Modifying Agent | Weight Percent | Microcrystalline Wax, Weight Percent | Laminating Strength, gms./inch | Low Temperature Flexibility, −10° F. | Consistency |
|---|---|---|---|---|---|
| None | 0 | 100 | 8 | Brittle— no bends. | Not tacky. |
| 150 viscosity Bright Stock. | 5 | 95 | 35 | ___do___ | Do. |
| Do | 10 | 90 | 67 | 12 bends | Do. |
| Do | 15 | 85 | 58 | 30 bends | Slightly tacky. |
| Do | 25 | 75 | 39 | ___do___ | Tacky. |
| Do | 35 | 65 | 29 | ___do___ | Do. |

It is concluded from the above results that a critical range of concentration of about 10 to about 15 weight percent of petroleum hydrocarbon lubricating oil fraction modifying agent is necessary when the agent is utilized in combination with the base microcrystalline wax to produce the desired laminating strength and flexibility of the final wax composition and render it suitable for coating and laminating purposes over a wide temperature range extending down to about −10° F. When the modifying agent is added in an amount less than about 10 weight percent of the composition, the laminating strength is lessened, and flexibility is usually non-existent, making the wax composition unsatisfactory as a dual-purpose coating and laminating agent for low-temperature use. When more than about 15 weight percent of the modifying agent is incorporated in the microcrystalline wax, undesirable stickiness and tackiness render the microcrystalline wax composition unsuitable as either a coating or laminating agent. Moreover, laminating strength decreases to a low value. A critical range of 10–15 weight percent of the above-specified type of modifying agents exists within which desired coating and laminating characteristics are obtained, that is, in which the laminating strength is high, the low-temperature flexibility is increased and the composition is essentially non-tacky.

The modifier may be added to the wax in any manner, that is, rapidly, slowly, intermittently, or continuously, with or without stirring, but in such a manner to produce a homogeneous wax composition with the modifier evenly distributed therein.

A non-limiting example of the composition of our invention appears below.

*Example I*

Van Zandt crude oil is subjected to fractionation by distillation to produce a lubricating oil fraction. Said lubricating oil fraction is subjected to vacuum distillation at about 750° F. and 100–120 mm. Hg to produce distillate lubricating oil fractions and a residuum with the following characteristics:

|  | API Gravity at 60 | Viscosity at 100° F. | Viscosity at 210° F. |
|---|---|---|---|
| Light lubricating distillate | 27.5 | 91 |  |
| Medium lubricating distillate | 24.5 | 245 |  |
| Heavy lubricating distillate | 22.5 |  | 68 |
| Residuum | 12–13 |  | 1,300 |

The distillates and residuum are further processed to produce neutrals and bright stock. The residuum is subjected to a dewaxing procedure which comprises mixing it at 140–150° F. and atmospheric pressure with methyl ethyl ketone and/or toluene in a proportion of 47 parts of methyl ethyl ketone to 53 parts of toluene and in a solvent-to-oil ratio of 4:1. The solvent-oil mixture is then chilled down to temperatures of about 12° F. to −14° F. during which time the wax crystallizes out of solution. The wax is removed from the solution by filtration.

After the above dewaxing procedure, the microcrystalline wax so isolated is subjected to a deoiling step which comprises remixing it with methyl ethyl ketone and/or toluene in the proportion of 47 parts methyl ethyl ketone to 53 parts toluene and in a ratio of solvent-to-oil of 8:1 at temperatures of 140–150° F. The solvent-wax mixture is then chilled down to temperatures of 35–50° F. during which time the desired wax crystallizes out of solution. This wax is separated from the oil and soft wax by filtration. The purified, deoiled, microcrystalline wax containing only about 0.7 weight percent of oil has the following characteristics:

Melting point, °F _____ 175
Penetration at 77° F _____ 15–20
Viscosity SUS at 210° F _____ 87.9
Stain test _____ Fail The above microcrystalline wax is utilized as the base wax in the preparation of the coating and laminating wax composition of our invention. To said base wax a petroleum lubricating oil fraction, namely, 150 viscosity bright stock is added in an amount of 15 weight percent to 85 weight percent of the base wax and the final composition after blending in a kettle with a "Lightnin" mixer exhibits the following characteristics in comparison with similar compositions prepared with 5 and 10 weight percent added oil:

|  | 0% | 5% | 10% | 15% |
|---|---|---|---|---|
| Flexibility at −10° F | 0 | Brittle | 12 | 30. |
| Laminating strength in grams per inch | 8 | 35 | 67 | 58. |
| Odor | 3 | 3 | 3.5 | 3. |
| Consistency | Not tacky | Not tacky | Not tacky | Slightly tacky. |

When applied to a paper surface, the coating and laminating wax adheres closely to said surface, remains flexible at temperatures as low as −10° F., does not present an objectionable odor or color, and does not chip, crack or peel from said surface. Moreover, said wax when applied between two prepared sheets of paper by passage over a heated roller at 212° F. forms satisfactorily bonded paper plies and remains flexible even at −10° F.

The hydrocarbon oil fraction in the composition of our invention which may be added to the microcrystalline wax includes any petroleum fraction in the lubricating oil range, exclusive of petrolatums or similar soft waxes.

The final composition of the microcrystalline wax-modifying agent combination is intended not only as a coating and laminating agent but as an impregnating, surface-treating, or sealing agent or any other type of wax agent wherein the particular properties of the composition may be utilized to advantage. Coloring compounds and other materials are contemplated as additives to our coating and lamination wax composition, whose properties other than coating and laminating characteristics may be modified in any useful way by the addition of such substances.

We claim:

1. A microcrystalline hydrocarbon wax composition of high laminating strength and low-temperature flexibility consisting of approximately 85 parts by weight substantially oil-free microcrystalline hydrocarbon wax having a melting point between 170 and 180° F. and approximately 15 parts by weight of an aromatic extract obtained by solvent extraction of mineral lubricating oil fractions, said composition having a laminating strength of at least 69 grams per inch and a flexibility at about −10° F. of at least 30 bends.

2. A composition in accordance with claim 1 in which the microcrystalline wax has a retained oil content below 1 percent by weight.

3. A composition in accordance with claim 2 in which the extract is obtained by phenol extraction of residual oil to make bright stock.

4. A composition in accordance with claim 2 in which the extract is obtained by phenol extraction of distillate oil to make neutral oil.

References Cited in the file of this patent
UNITED STATES PATENTS

| | | |
|---|---|---|
| 2,348,689 | Abrams et al. | May 9, 1944 |
| 2,373,634 | Wagner | Apr. 10, 1945 |
| 2,441,202 | Maier et al. | May 11, 1948 |
| 2,598,257 | Hill et al. | May 27, 1952 |